Nov. 9, 1937.  H. E. WISE  2,098,683

BEARING

Filed Oct. 6, 1932  5 Sheets-Sheet 1

INVENTOR
Harry E. Wise
BY Ely & Barrow
ATTORNEYS

Nov. 9, 1937.                H. E. WISE                2,098,683
                              BEARING
                        Filed Oct. 6, 1932            5 Sheets-Sheet 2

INVENTOR
Harry E. Wise
BY
Ely & Barrow
ATTORNEYS

Nov. 9, 1937.    H. E. WISE    2,098,683
BEARING
Filed Oct. 6, 1932    5 Sheets-Sheet 3

INVENTOR
Harry E. Wise
BY Ely & Barrow
ATTORNEYS

Nov. 9, 1937.       H. E. WISE        2,098,683
BEARING
Filed Oct. 6, 1932       5 Sheets-Sheet 4

INVENTOR
Harry E. Wise
BY
Ely & Barrow
ATTORNEYS

Nov. 9, 1937.  H. E. WISE  2,098,683

BEARING

Filed Oct. 6, 1932  5 Sheets-Sheet 5

INVENTOR
Harry E. Wise
BY Ely & Barrow
ATTORNEYS

Patented Nov. 9, 1937

2,098,683

UNITED STATES PATENT OFFICE 2,098,683

BEARING

Harry E. Wise, Canton, Ohio

Application October 6, 1932, Serial No. 636,491

25 Claims. (Cl. 308—214)

This invention relates to bearings of the type employing rolling elements such as rollers or balls.

Roller or ball bearings as have heretofore been constructed include inner and outer races and rollers or balls therebetween retained therein between ribs at the sides of the races, the distance between the ribs being slightly greater than the length of the rollers or the diameters of the balls.

The rollers or balls in this type of bearing accordingly tend to press when under load against one rib which is generally called the pressure rib. This rib also serves as the guiding rib, there being under these conditions a clearance between the rolling elements and the other rib and this latter rib accordingly acts merely as a keeper although it frequently is called a guiding rib. The only action of this so-called guiding rib is to restrain the elements from getting too far out of alignment.

During rotation of this type of bearing under a radial load it is generally true that as each element passes into the load zone it is forced against the pressure rib and as it passes out of the load zone it becomes loose or free. This permits it to get away from its true path and out of correct alignment to the extent permitted by the clearance. The elements accordingly do not function properly until forced or snapped against the pressure rib and brought into proper alignment as they pass into the load zone.

One purpose of the present invention is to provide a bearing of this type in which the elements are in contact with the pressure rib and in correct alignment at all times whereby wear in the bearing is substantially reduced.

Another purpose of the invention is to provide a bearing of this type in which such correct alignment is maintained at all times, wear being compensated for by self-adjustment of the bearing.

A further purpose of the invention is to provide a bearing of this type in which the elements are maintained in correct alignment between the races and the use of a cage is not required.

A further purpose is to effect quieter operating characteristics by slightly preloading the elements which provides that the elements are never free to rattle or to rub against each other causing friction.

The foregoing and other purposes of the invention are attained in the bearings illustrated in the accompanying drawings and described below. The invention is not limited in its application to the particular forms thereof shown.

Of the accompanying drawings.

Figure 1:
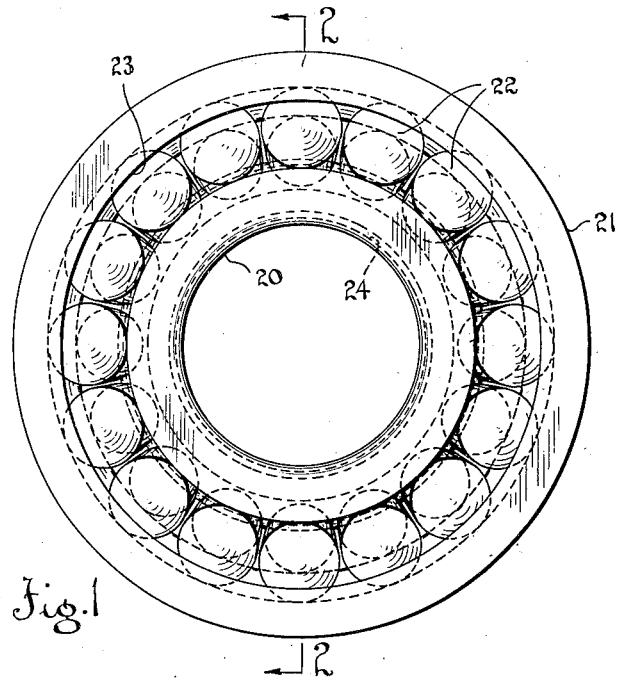
Figure 1 is a left end view of a bearing embodying the invention as shown in section in Figure 2.
Figure 2:
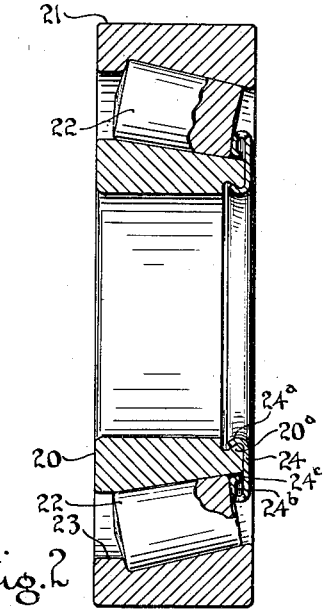
Figure 2 is a section on line 2—2 of Figure 1.

Referring to Figures 1 and 2 of the drawings, the numeral 20 designates an inner race and 21 an outer race between which are tapered rollers 22, 22. This bearing has a pressure rib 23 on the outer race. The large ends of the rollers are preferably convexly conical as shown and the inside wall of rib 23 is correspondingly formed. The present invention, however, is applicable to other suitable roller-rib formations to provide desired roller-rib contacting points to sustain the pressure.

In this form of the invention the guiding rib (which under this invention is truly a guiding rib and not merely a keeper) is provided by a ring 24 adapted to exert a yielding pressure against the small ends of the rollers. This ring may be secured to the inner race and may comprise sheet metal having an inwardly bent flange 24ª embracing an inner peripheral rib 20ª on the inner race and a reversely bent flange portion 24ᵇ for contacting the small ends of the rollers, the reverse bend providing a yielding support for flange 24ᵇ whereby it may be self-adjusting to maintain contact with the small ends of the rollers to compensate for wear. Initially before assembly of the bearing the rollers 22 are longer than the distance between the inside wall of rib 23 and the flange 24ᵇ, the latter being sprung or deflected outwardly of the bearing upon assembly of the bearing whereby the ring 24 maintains a constant yielding pressure upon the rollers at all times holding them against the pressure rib and in accurate alignment. The small ends of the rollers preferably are of concaveconical formation, as shown, whereby the guiding influence of the ring 24 is most effective. As will be evident the yielding pressure of ring 24 forces the rollers up the cone of the inner race and takes up play between the inner race, rollers and outer race.

The amount of pressure to be exerted upon the ends of the rollers will be proportional to the rated loads imposed on the rollers and the developed thrust components within the bearing due to the conical construction which varies with the size of the bearing. It is conceivable, of course, that bearings in actual service will at times be subjected to unusual shock loads and that the above-mentioned thrust component reacting upon ring 24 will cause deflection of same more than is intended. The above construction proposes to limit this reverse spring reaction by providing a non-yielding portion at 24c to be engaged by the yielding portion 24b of ring 24. This prevents the destruction of the spring by unusual shock loads.

Figures 3, 4, 5, 6:
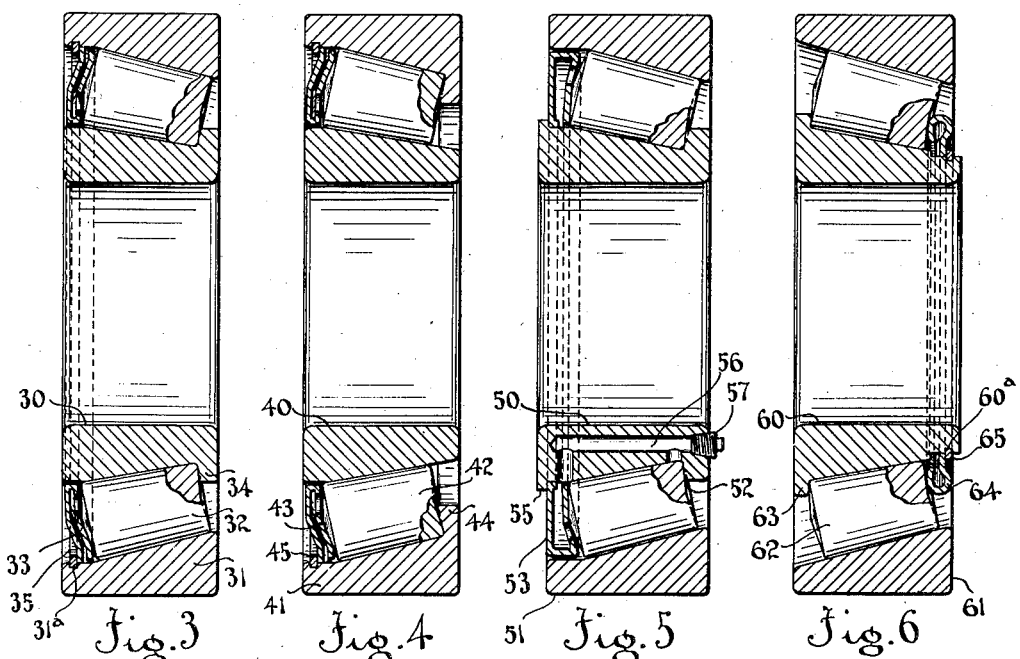
Figures 3 to 8 are similar views of other forms of the invention.

Figure 3 shows a similar construction with the exception that the guiding rib 34 is integral with the inner race 30 and the pressure rib 33 is of yielding construction comprising a ring of reversely-bent sheet metal shaped to conform to the large ends of the rollers 32 and contacting these radially outwardly from the centers thereof, said ring being retained in place by suitable means such as a split ring 35 sprung into a groove 31a in the outer race 31. As will be understood, the ring 33 is normally so formed that the inner flange thereof will be sprung or deflected outwardly upon assembly of the bearing to exert yielding pressure upon the large ends of the roller at all times whether or not the rollers are in the load zone. A limited amount of reverse spring movement can take place because the yielding ring surface will contact solidly with a non-yielding portion of itself after very slight movement.

Figure 4 shows a similar construction including inner race 40, outer race 41 and rollers 42, the guiding rib being integral with the outer race as at 44 and the pressure rib comprising the yielding ring 43 retained by split ring 45 which also limits the reverse travel of yielding ring 43.

Figure 5 shows a similar construction including inner race 50, outer race 51, rollers 52 and a yielding, reversely-bent, sheet metal ring 53, the latter being retained by a rib 55 on the inner race with means of limiting reverse travel of the yielding member. It will be noted that in all forms of the invention thus far described, the reversely-bent, sheet metal rings provide chambers for collecting lubricant. In the form shown in Figure 5, a lubricant supply duct 56 is shown extending through the inner race into communication with the chamber defined by ring 53, this duct having a suitable plug closure or lubricant supply fitting 57 threaded into the outer end thereof.

In the form of invention shown in Figure 6, the inner race is designated 60, the outer race 61, and the rollers 62. The pressure rib 63 is integral with the inner race and the guiding rib is provided by a yielding ring 64 retained on the inner race by a split ring 65 sprung into a groove 60a in the inner race with means of limiting the reverse travel of the yielding member.

Figure 7:
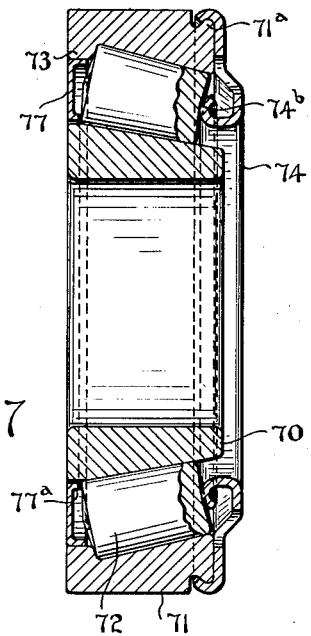

Referring to Figure 7 of the drawings, the numeral 70 designates the inner race, 71 the outer race, and 72 the rollers. The pressure rib 73 is integral with the outer race and the guiding rib is provided by a ring 74 having a flange 74a bent to embrace a rib 71a on the outer periphery of the outer race with the reversely bent portion 74b contacting the rollers. In this form of the invention a keeper 77 comprising a ring secured to the outer race adjacent the pressure rib is provided for retaining the rollers in the outer race upon removal of the inner race, this keeper having a flange 77a so embracing (but preferably not contacting) the large ends of the rollers as to retain the rollers in the outer race when the inner race is removed. This keeper preferably has only slight clearance from the inner race to provide a bearing closure and also providing a lubricant retaining chamber about the large ends of the rollers.

Figure 8:
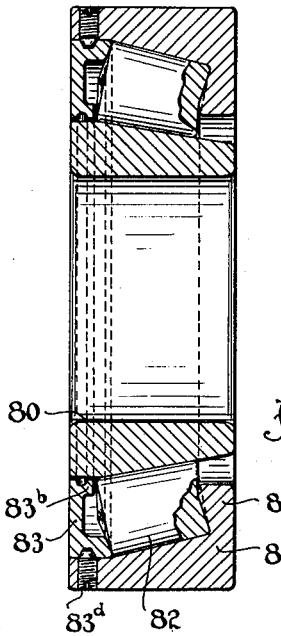
Figure 9:
Figure 9 is a front elevation of the adjustable ring shown in Figure 8.
Figure 10:
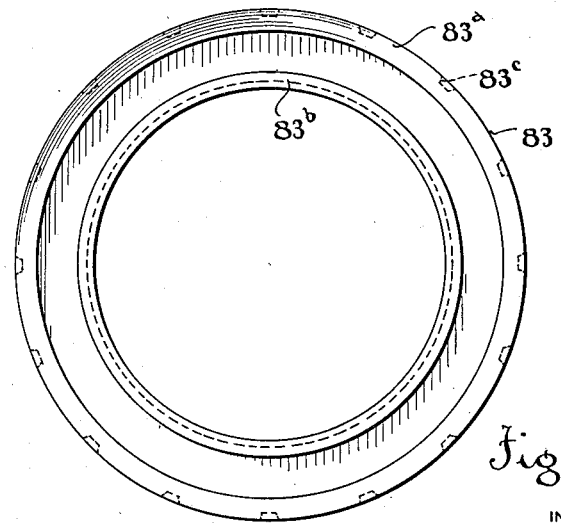
Figure 10 is an end elevation thereof.

In the form of the invention shown in Figures 8, 9 and 10, the inner race is designated 80, the outer race 81 and the rollers 82. In this form the guiding rib may be integral with the outer race as at 84 and the pressure rib may be provided by a rigid or non-yielding ring 83 formed with an outer flange 83a providing the pressure sustaining wall with which the large ends of the rollers contact and an inner portion 83 having clearance from the ends of the rollers and preferably having only slight clearance from the inner race to provide a closure and lubricant-retaining chamber as will be understood. The inner portion 83b may sufficiently embrace the ends of the rollers as to retain the rollers in the outer race upon removal of the inner race. The ring 83 may be adjustably secured to the outer race by providing apertures or sockets in the outer periphery thereof as at 83c staggered axially of the ring to be engaged by set-screws 83d extending through the outer race, the adjustment being obtained by forcing the ring 83 axially inwardly against the large ends of the rollers and securing the set screws in those sockets which will register with the set screws in the different positions of adjustment. This places the races under tension, affording a take-up maintaining the rollers in alignment and compensating for some wear between adjustments.

Figure 11:
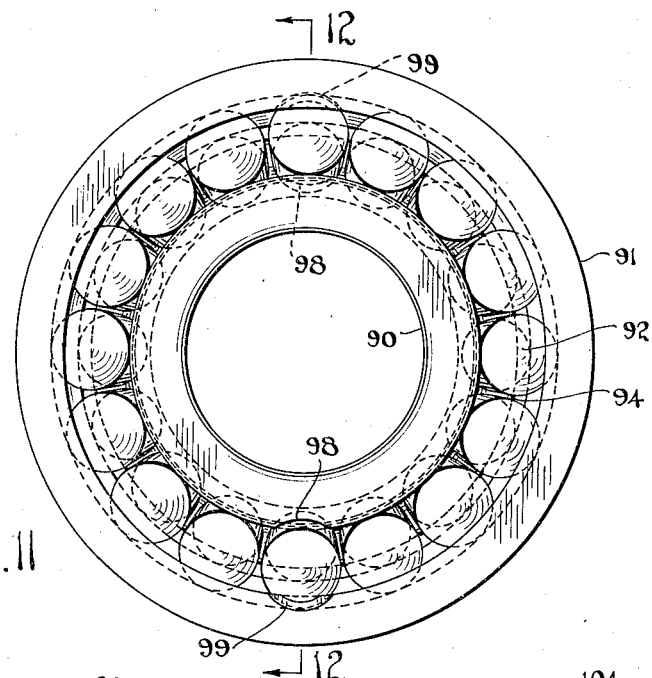
Figure 11 is a left end elevation of a double bearing embodying the invention as illustrated in section in Figure 12.
Figure 12:
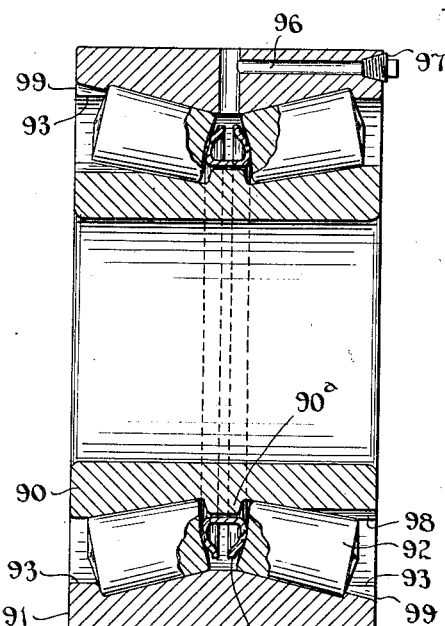
Figure 12 is a section on line 12—12 of Figure 11.
Figure 13:
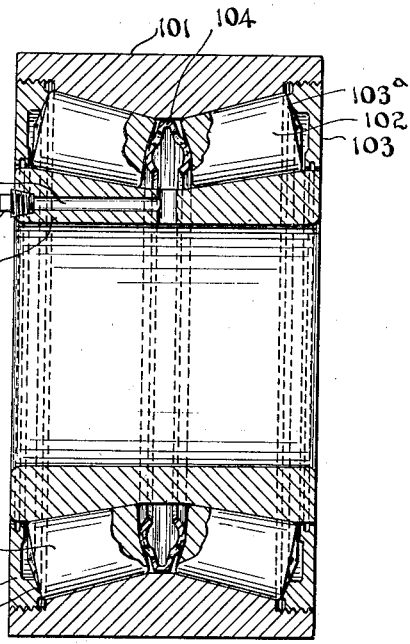
Figure 13 is a similar view of another form of double bearing embodying the invention.

The invention may be embodied in a double bearing as illustrated in Figures 11 and 12 and also in a different form in Figure 13.

In Figures 11 and 12, the inner race is shown at 90 formed with a central rib 90a, the outer race at 91 provided with pressure ribs 93, 93 and a single intermediate yielding ring of reversely-bent sheet metal 94 is arranged between the inner small ends of the rollers 92 to provide a guiding rib for both sets of rollers, this ring floating between the rollers but being centered by the rib 90a which it surrounds. A lubricant duct 96 with closure or fitting 97 may be provided to carry lubricant into the chamber between the inner ends of the rollers. The inner and outer races may be notched as at 98 and 99 to provide for insertion of the rollers into the bearing.

The double bearing of Figure 13 includes an inner race 100, an outer race 101 and rollers 102 with rings 103, 103 threaded into the outer race provided with pressure rib walls 103a, 103a and extending into such relation with slight clearance to the inner race closures and defining lubricant-holding chambers about the large ends of the rollers. The guiding rib is defined by a central yielding ring 104 compressed between the inner ends of the rollers and centered by the bore of the outer race, the desired degree of pressure of the guiding ring against the rollers being attained, and maintained upon subsequent adjustments by screwing the rings 103 into the outer race the required extent. Lubricant may be supplied to the chamber between the inner ends of the rollers by a duct 106 in the inner race having a closure or fitting 107.

Figure 14:
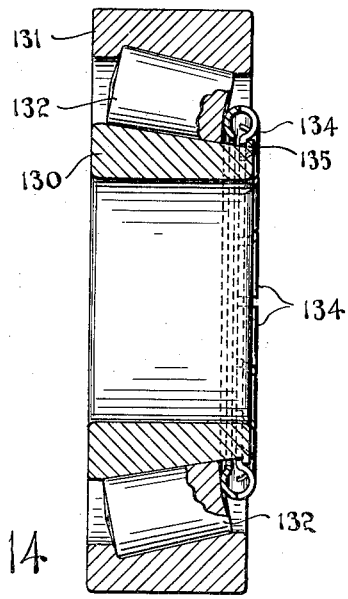
Figures 14 to 22 are radial sectional views of other forms of the invention.

The single row bearing in Figure 14 including an inner race 103, an outer race 131 and rollers 132, 132, is similar in principle to Figure 2 with a somewhat improved method of engaging a ring 133, provided with slits defining yielding fingers 134, 134, with a rib 135 of the inner race such as to provide easy disassembly as well as assembly.

Figure 15:
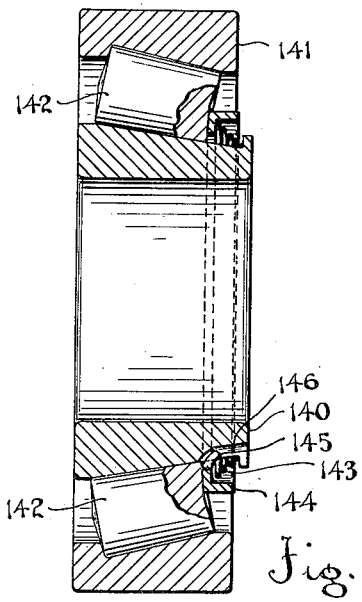

Figure 15 shows a bearing including an inner race 140, an outer race 141 and rollers 142 having a conical coiled spring 143 as the means of exerting pressure on the yielding ring 144 engaging the small ends of the rollers, this separate ring 144 having a tongue 145 engaging a slot 146 in the inner race to prevent rotation.

Figure 16:
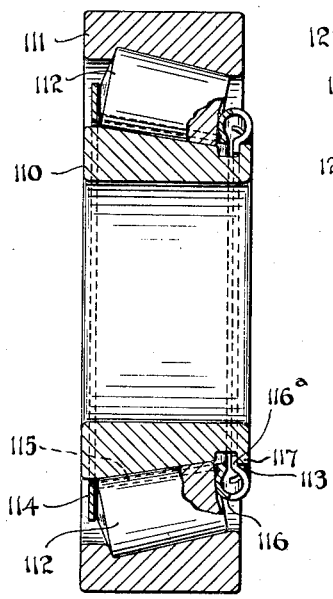

The single bearing of Figure 16 includes an inner race 110, an outer race 111, rollers 112 and a cage 113 with an annular flange 114 adjacent to the large ends of the rollers, and integral separating fingers 115, 115 of the cage between the rollers extending laterally through the bearing to the integral ring 116 at the small ends of the rollers which exerts yielding pressure upon the small ends of the rollers and which yielding ring has a reversely bent portion 116ª slit to provide fingers engaging and sliding around a lip or rib 117 of the inner race and the portion 116ª providing means for limiting reverse travel of the yielding ring under unusual shock load.

Figure 17:
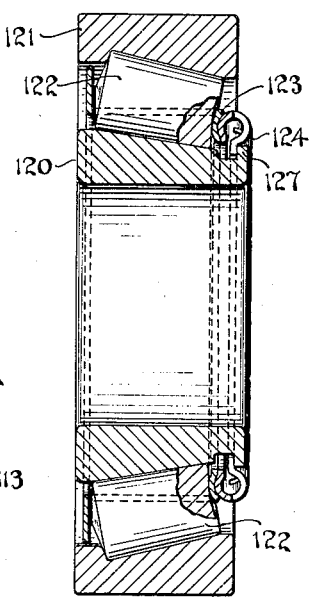

The single bearing of Figure 17 including an inner race 120, an outer race 121 and rollers 122 is similar except that the cage is in two pieces, the cage proper 123 and the yielding ring 124, which engages the rib 127 on the inner race and in which reverse travel of the yielding ring is limited.

Figure 18:
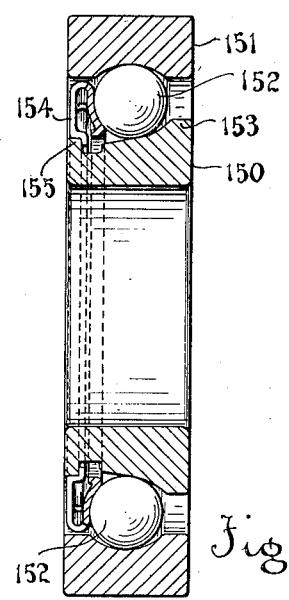

Figure 18 shows the self-adjusting principle in a bearing with balls as rolling elements. This bearing includes an inner race 150, an outer race 151, balls 152, 152, a rigid rib 153 and a yielding rib provided by a yielding ring 154 of reversely-bent sheet metal engaged inwardly of a rib 155 on the inner race, this ring being similar to the rings shown in Figures 14, 16 and 17.

Figure 19:
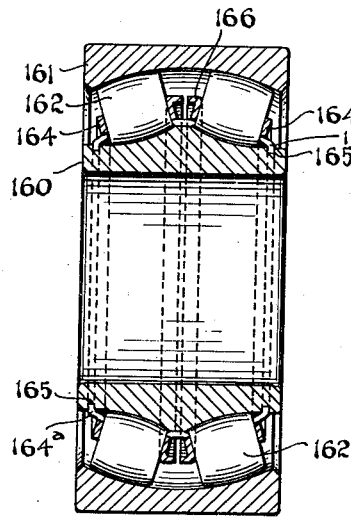

Figure 19 illustrates a double roller bearing embodying the invention including inner and outer races 160 and 161, barrel-shaped rollers 162, 162 therebetween, and preloading, self-adjusting ribs provided by outer rings 164, 164 having yielding finger portions 164ª, 164ª engaged in slots or grooves 165 in the inner race and an intermediate floating, yielding or resilient ring 166 similar to ring 94 of Figure 12.

Figure 20:
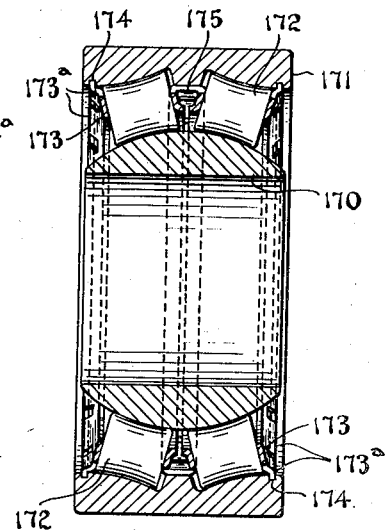

A double bearing using hour-glass rollers and embodying the invention is illustrated in Figure 20. This includes an inner race 170, an outer race 171, rollers 172, 172, outer ribs provided by rings 173, 173 yieldingly mounted by fingers 173ª, 173ª in slots 174 in the outer race and an intermediate, floating, resilient ring 175 similar to ring 104 in Figure 13.

Figure 21:
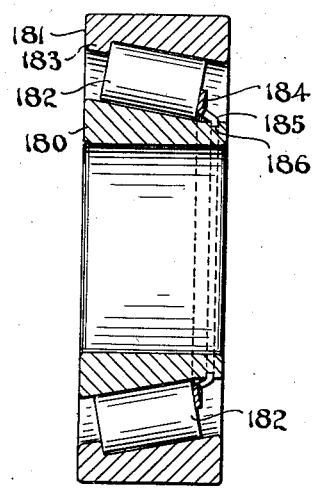

The invention may be embodied in a roller bearing having frusto-conical or tapered raceways and cylindrical rollers as shown in Figure 21. The inner race is designated 180, the outer race 181, the rollers 182, 182, the outer race having a rigid rib 183 on one side and the inner race a yielding rib on the other side comprising a ring 184 having yielding fingers 185, 185 engaged in slots 186 in the inner race.

Figure 22:
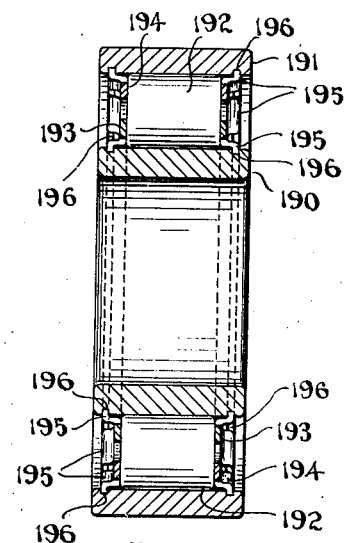

A further application of the invention may be made to a bearing having cylindrical raceways and cylindrical rollers. Such a bearing is shown in Figure 22 and includes inner race 190, outer race 191, rollers 192, 192 and inner and outer rings 193 and 194 on both sides of the bearing, each being retained in the adjacent races by yielding fingers as indicated at 195 engaged in slots 196 in the races.

Modifications of the invention other than those illustrated may be resorted to without departing from the spirit of the invention or the scope of the appended claims.

What is claimed is:—

1. A tapered roller bearing comprising inner and outer races, rollers between the races, and circumferential pressure and guiding ribs in direct contact with the opposite ends of the rollers under a thrust axially thereof at all times, one of said ribs being provided by a reversely-bent sheet metal ring retained on one of the races and defining a lubricant-retaining chamber.

2. A tapered roller bearing comprising inner and outer races, rollers, between the races, and circumferential pressure and guiding ribs in direct contact with the opposite ends of the rollers under a thrust axially thereof at all times, one of said ribs being provided by a reversely-bent sheet metal ring retained in one of the races.

3. A double roller bearing comprising inner and outer races, each having two spaced raceways, circumferential ribs at the outer ends of the bearing for retaining the rollers in the raceways, and an intermediate resilient guiding ring between the raceways for directly engaging the inner ends of the rollers, said ring floating in the bearing between the raceways and being compressed between the inner ends of the rollers to hold the outer ends of the rollers under an axial thrust against said ribs at all times.

4. A double roller bearing comprising inner and outer races, each having two spaced raceways, circumferential ribs at the outer ends of the bearing for retaining the rollers in the raceways, and an intermediate resilient guiding ring between the raceways for directly engaging the inner ends of the rollers, said ring being compressed between the inner ends of the rollers to hold the outer ends of the rollers under an axial thrust against said ribs at all times.

5. A double bearing including inner and outer double races and rollers between the races, axially adjustable circumferential members at the outer ends of the races for engaging the outer ends of the rollers, and yielding means including circumferential projections directly engaging the inner ends of the rollers, said means exerting an axial thrust on said rollers at all times.

6. A tapered roller bearing comprising inner and outer races having conical raceways, one of said races being provided with a circumferential rib, frusto-conical rollers disposed between said races and having rolling engagement with said raceways, the end faces on one end of said rollers being engageable with said circumferential rib, and a member secured to one of said races and having a resilient portion extending circumferentially in direct contact with the end faces on the opposite ends of said rollers.

7. A tapered roller bearing comprising inner and outer races having conical raceways, one of said races being provided with a circumferential rib, frusto-conical rollers disposed between said races and having rolling engagement with said raceways, the end faces on one end of said rollers being engageable with said circumferential rib, and a member secured to one of said races and having a resilient portion extending circumferentially in direct contact with the end faces on the opposite ends of said rollers for exerting an axial pressure thereon to maintain the opposite end faces of said rollers in engagement with said rib.

8. A tapered roller bearing comprising inner and outer races having conical raceways, the outer race having an inwardly extending circumferential rib, frusto-conical rollers disposed between said races and having rolling engagement with said raceways, the end faces on one end of said rollers being engageable with said circumferential rib, and a member secured to the inner race and having a resilient portion extending circumferentially in direct contact with the end faces on the opposite ends of said rollers for exerting an axial pressure thereon to maintain engagement between the opposite end faces of said rollers and said rib.

9. A tapered roller bearing comprising inner and outer races having conical raceways, a member adjustably mounted on one of said races and having a circumferential rib, frusto-conical rollers disposed between said races and having rolling engagement with said raceways, the end faces on one end of said rollers being engageable with said circumferential rib, and a member having a resilient portion extending circumferentially in direct contact with the end faces on the opposite ends of said rollers for exerting a pressure thereon to maintain engagement between the opposite end faces of said rollers and said rib.

10. A tapered roller bearing comprising inner and outer races having conical raceways, one of said races being provided with a circumferential rib, frusto-conical rollers disposed between said races and having rolling engagement with said raceways, the end faces on one end of said rollers being engageable with said circumferential rib, and a resilient member secured to one of said races and directly engaging all of the end faces on the opposite ends of said rollers for exerting a pressure thereon to maintain the opposite end faces of said rollers in engagement with said rib.

11. A roller bearing comprising inner and outer races having raceways, one of said races having a circumferential rib, rollers disposed between said races and having rolling engagement with said raceways, said rollers being engageable with said circumferential rib, and a member secured to one of said races and having a resilient portion extending circumferentially in direct contact with said rollers at a location opposite to said rib for exerting a pressure on said rollers to maintain the latter in engagement with said rib.

12. A bearing comprising inner and outer races having raceways, rolling elements rotatably disposed between said raceways and a member secured to one of said races and having a resilient portion extending circumferentially in direct contact with ends of said rolling elements and exerting yielding pressure on said ends to hold said elements yieldingly in alignment.

13. A bearing comprising inner and outer races having raceways, rolling elements rotatably disposed between said raceways and a member secured to one of said races and having a resilient portion extending circumferentially in direct contact with said rolling elements, said resilient portion being unrestricted within the limits of its resilience in amount of travel toward the rolling elements but closely restricted in amount of travel away from the rolling elements.

14. A bearing comprising inner and outer races having raceways, rolling elements rotatably disposed between said raceways, a member secured to one of the races and having a resilient portion extending circumferentially and exerting a pressure on said rolling elements to maintain the latter in direct contact with the raceways of both races, said resilient portion being unrestricted within the limits of its resilience in amount of travel toward the rolling elements but closely restricted in amount of travel away from the rolling elements.

15. A bearing comprising inner and outer races having raceways, rolling elements rotatably disposed between said raceways and members secured to said races having resilient portions extending circumferentially in direct contact with said rolling elements, said resilient portions being unrestricted within the limits of its resilience in amount of travel toward the rolling elements but closely restricted in amount of travel away from the rolling elements.

16. A tapered roller bearing comprising inner and outer races having conical raceways, one of said raceways being provided with a circumferential rib, frusto-conical rollers disposed between said races and having rolling engagement with said raceways, the end faces on one end of said rollers being engageable with said circumferential rib, a resilient member secured to the other of said races and directly engaging the end faces on the opposite ends of said rollers, said member having a resilient portion unrestricted within the limits of its resilience in amount of travel toward the rollers but closely restricted in amount of travel away from the rollers.

17. A tapered roller bearing comprising inner and outer races having conical raceways, one of said raceways being provided with a circumferential rib, frusto-conical rollers disposed between said races, the end faces on one end of said rollers being engageable with said circumferential rib, a cage for spacing the rollers circumferentially around the raceways, a sliding resilient connection between said cage and one of the races exerting pressure on the rollers, said resilient connection being unrestricted within the limits of its resilience in amount of travel toward the rollers but closely restricted in amount of travel away from the rollers.

18. A bearing comprising inner and outer races having raceways, rolling elements rotatably disposed between said raceways, a cage for spacing the rolling elements circumferentially around the raceways, a sliding resilient connection between said cage and one of the races exerting pressure on the rolling elements, said resilient connection being unrestricted within the limits of its resilience in amount of travel toward the rollers but closely restricted in amount of travel away from the rollers.

19. A taper roller bearing comprising inner and outer conical raceway members, a rib at the large end of the raceway of one of said members, a washer engaging the small ends of said rollers and a spring ring engaging said washer to force said rollers towards said rib.

20. A taper roller bearing comprising inner and outer conical raceway members, a rib at the large end of the raceway of one of said members, and a spring ring at the ends of the rollers remote from said rib for forcing them against said rib.

21. A tapered roller bearing comprising an inner race, and outer race having a rib at the large end of the outer raceway, conical rollers between said outer and inner races with their large ends in engagement with said rib, and a resilient circumferential rib means engaging said rollers at the end remote from said rib to yieldingly urge said rollers against said rib, said resilient means being attached to the inner race.

22. A tapered roller bearing comprising an inner race, an outer race, a rib on one of the races conical rollers between said races, circumferential rib means for yieldingly holding said rollers at one end in engagement with said rib said yielding means engaging the opposite ends of said rollers, said yielding means being attached to the other race.

23. In a bearing comprising inner and outer raceways, and rolling elements radially and laterally movable between the raceways, circumferential rib means for restraining lateral movement of the rolling elements at one side of the bearing and circumferential rib means for yieldingly urging all of said elements against said restraining means and for yieldingly urging all of said elements radially to maintain said elements in load-sustaining positions between said raceways at all times.

24. A tapered roller bearing comprising inner and outer members having conical raceways, a rib at one end of one of the raceways, a spring ring on the other raceway at the ends of the rollers remote from said rib for forcing the rollers axially against said rib and thereby axially urging said other raceway in a direction to force the rollers radially against the first raceway.

25. A bearing comprising inner and outer raceway members, a rib at one end of one of the raceways, a spring ring on the other raceway contacting the rolling elements remote from said rib and forcing the rolling elements against said rib and axially urging the rolling elements radially against the first raceway.

HARRY E. WISE.